US012689696B2

(12) United States Patent　　　　　　　(10) Patent No.:　US 12,689,696 B2
Inoue　　　　　　　　　　　　　　　　　　　(45) Date of Patent:　　　　Jul. 21, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM BUSINESS INNOVATION CORP., Tokyo (JP)

(72) Inventor: Seiji Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/179,574

(22) Filed: Mar. 7, 2023

(65) Prior Publication Data

US 2024/0073339 A1　　Feb. 29, 2024

(30) Foreign Application Priority Data

Aug. 23, 2022　(JP) ................................. 2022-132607

(51) Int. Cl.
H04N 1/00　　　　　(2006.01)
(52) U.S. Cl.
CPC ..... H04N 1/00933 (2013.01); H04N 1/00973 (2013.01)
(58) Field of Classification Search
CPC ... H04N 1/00933; H04N 1/00973; H04N 1/00
See application file for complete search history.

(56) References Cited

U.S. PATENT DOCUMENTS

| | | | | |
|---|---|---|---|---|
| 6,317,829 | B1 * | 11/2001 | Van Oorschot | ....... H04L 9/3263 |
| | | | | 713/168 |
| 6,615,297 | B1 * | 9/2003 | Beard | ................... G06F 3/1284 |
| | | | | 710/72 |
| 2013/0222837 | A1 * | 8/2013 | Watanabe | ............. H04L 63/083 |
| | | | | 358/1.14 |
| 2015/0249709 | A1 * | 9/2015 | Teng | ....................... G06F 16/13 |
| | | | | 707/785 |
| 2018/0152881 | A1 * | 5/2018 | Tipton | .................. H04W 76/11 |

(Continued)

FOREIGN PATENT DOCUMENTS

| | | |
|---|---|---|
| JP | 2020-119016 A | 8/2020 |
| JP | 2022-036754 A | 3/2022 |

OTHER PUBLICATIONS

Mar. 31, 2026 Office Action issued in Japanese Patent Application No. 2022-132607.

*Primary Examiner* — Iriana Cruz
(74) *Attorney, Agent, or Firm* — Oliff PLC

(57)　　　ABSTRACT
An information processing apparatus includes a processor configured to: perform, upon synchronization of information to be processed related to processing between the information processing apparatus and a virtual apparatus which is an apparatus as a virtual one, when the information to be processed is private processing information that is information on private processing of a user, the synchronization on a private virtual apparatus which is a virtual apparatus corresponding to the private processing, and when the information to be processed is public processing information that is information on public processing, the synchronization on a public virtual apparatus which is a virtual apparatus corresponding to the public processing.

6 Claims, 7 Drawing Sheets

53

| TYPE OF DATA | SYNCHRONIZATION DESTINATION | | EXPLANATION |
|---|---|---|---|
| | PUBLIC | PRIVATE | |
| DESTINATION DATA | ONLY PUBLIC VIRTUAL APPARATUS | ONLY PRIVATE VIRTUAL APPARATUS | FAX NUMBERS, MAIL ADDRESSES OF BUSINESS CONTACTS ARE INCLUDED AS PUBLIC DATA. FAX NUMBERS, MAIL ADDRESSES OF FAMILY AND/OR FRIENDS ARE INCLUDED AS PRIVATE DATA. |
| DOCUMENT | ONLY PUBLIC VIRTUAL APPARATUS | ONLY PRIVATE VIRTUAL APPARATUS | CONTRACT DOCUMENT IS INCLUDED AS PUBLIC DOCUMENT. LETTERS AND PHOTOS ARE INCLUDED AS PRIVATE DOCUMENT. |
| JOB LOG | BOTH PUBLIC AND PRIVATE VIRTUAL APPARATUSES | BOTH PUBLIC AND PRIVATE VIRTUAL APPARATUSES | RECORD OF PROCESSING. MAINLY USED BY A COMPANY TO UTILIZE THE ACTIVITIES OF EMPLOYEES. IN PRINCIPLE, PRIVATE INFORMATION IS NOT INCLUDED. |
| IMAGE LOG | ONLY PUBLIC VIRTUAL APPARATUS | ONLY PRIVATE VIRTUAL APPARATUS | THUMBNAIL IMAGES OF DOCUMENTS HANDLED IN PROCESSING. CONFIDENTIALITY EQUIVALENT TO DOCUMENT IS HELD. |
| AUDIT LOG | BOTH PUBLIC AND PRIVATE VIRTUAL APPARATUSES | BOTH PUBLIC AND PRIVATE VIRTUAL APPARATUSES | RECORD OF EVENTS NOT TO BE PROCESSED. FOR EXAMPLE LOGIN AND CHANGE OF SETTING ARE RECORDED. MAINLY USED BY A COMPANY TO UTILIZE THE ACTIVITIES OF EMPLOYEES. IN PRINCIPLE, PRIVATE INFORMATION IS NOT INCLUDED. |
| SETTING | BOTH PUBLIC AND PRIVATE VIRTUAL APPARATUSES | BOTH PUBLIC AND PRIVATE VIRTUAL APPARATUSES | FOR EXAMPLE, TIME AND DEFAULT PARAMETERS AT THE TIME OF EXECUTION OF COPY FUNCTION. MAINLY USED BY A COMPANY TO UTILIZE THE ACTIVITIES OF EMPLOYEES. IN PRINCIPLE, PRIVATE INFORMATION IS NOT INCLUDED. |

(56)     References Cited

U.S. PATENT DOCUMENTS

| | | | |
|---|---|---|---|
| 2020/0233619 A1* | 7/2020 | Hosoda | G06F 3/1236 |
| 2022/0083292 A1* | 3/2022 | Yamagishi | G06F 3/1238 |
| 2022/0222019 A1* | 7/2022 | Zhang | G06F 9/452 |

* cited by examiner

FIG. 4

53

| USER NAME | TYPE OF DATA | SYNCHRONIZATION-DESTINATION ADDRESS |
|---|---|---|
| private1@freemail.com | DOCUMENT | taro.shadow.com |
| | ADDRESSEE DATA | taro.shadow.com |
| | JOB LOG | abc-service.shadow.com, taro.shadow.com |
| private2@freemail.com | DOCUMENT | jiro.shadow.com |
| | ADDRESSEE DATA | jiro.shadow.com |
| | JOB LOG | abc-service.shadow.com, jiro.shadow.com |
| ⋮ | ⋮ | ⋮ |
| employee1@abc-service.com | DOCUMENT | abc-service.shadow.com |
| | ADDRESSEE DATA | abc-service.shadow.com |
| | JOB LOG | abc-service.shadow.com, taro.shadow.com |
| employee2@abc-service.com | DOCUMENT | abc-service.shadow.com |
| | ADDRESSEE DATA | abc-service.shadow.com |
| | JOB LOG | abc-service.shadow.com, jiro.shadow.com |
| ⋮ | ⋮ | ⋮ |

FIG. 9

53

| TYPE OF DATA | SYNCHRONIZATION DESTINATION | | EXPLANATION |
| --- | --- | --- | --- |
| | PUBLIC | PRIVATE | |
| DESTINATION DATA | ONLY PUBLIC VIRTUAL APPARATUS | ONLY PRIVATE VIRTUAL APPARATUS | FAX NUMBERS, MAIL ADDRESSES OF BUSINESS CONTACTS ARE INCLUDED AS PUBLIC DATA. FAX NUMBERS, MAIL ADDRESSES OF FAMILY AND/OR FRIENDS ARE INCLUDED AS PRIVATE DATA. |
| DOCUMENT | ONLY PUBLIC VIRTUAL APPARATUS | ONLY PRIVATE VIRTUAL APPARATUS | CONTRACT DOCUMENT IS INCLUDED AS PUBLIC DOCUMENT. LETTERS AND PHOTOS ARE INCLUDED AS PRIVATE DOCUMENT. |
| JOB LOG | BOTH PUBLIC AND PRIVATE VIRTUAL APPARATUSES | BOTH PUBLIC AND PRIVATE VIRTUAL APPARATUSES | RECORD OF PROCESSING. MAINLY USED BY A COMPANY TO UTILIZE THE ACTIVITIES OF EMPLOYEES. IN PRINCIPLE, PRIVATE INFORMATION IS NOT INCLUDED. |
| IMAGE LOG | ONLY PUBLIC VIRTUAL APPARATUS | ONLY PRIVATE VIRTUAL APPARATUS | THUMBNAIL IMAGES OF DOCUMENTS HANDLED IN PROCESSING CONFIDENTIALITY EQUIVALENT TO DOCUMENT IS HELD. |
| AUDIT LOG | BOTH PUBLIC AND PRIVATE VIRTUAL APPARATUSES | BOTH PUBLIC AND PRIVATE VIRTUAL APPARATUSES | RECORD OF EVENTS NOT TO BE PROCESSED. FOR EXAMPLE, LOGIN AND CHANGE OF SETTING ARE RECORDED. MAINLY USED BY A COMPANY TO UTILIZE THE ACTIVITIES OF EMPLOYEES. IN PRINCIPLE, PRIVATE INFORMATION IS NOT INCLUDED. |
| SETTING | BOTH PUBLIC AND PRIVATE VIRTUAL APPARATUSES | BOTH PUBLIC AND PRIVATE VIRTUAL APPARATUSES | FOR EXAMPLE, TIME AND DEFAULT PARAMETERS AT THE TIME OF EXECUTION OF COPY FUNCTION. MAINLY USED BY A COMPANY TO UTILIZE THE ACTIVITIES OF EMPLOYEES. IN PRINCIPLE, PRIVATE INFORMATION IS NOT INCLUDED. |

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-132607 filed Aug. 23, 2022.

BACKGROUND

(i) Technical Field

The present disclosure relates to an information processing apparatus, a non-transitory computer readable medium storing information processing program, and an information processing method.

(ii) Related Art

As a technique to utilize a virtual apparatus which is an apparatus as a virtual one, the following technique is known.

Japanese Unexamined Patent Application Publication No. 2020-119016 discloses a printing device, and its object is to provide a printer that, upon acquisition of print data from a cloud print service, is likely to acquire the print data with an appropriate protocol.

The printing device is compatible with a cloud print service, and includes: a unit that acquires information on a printer queue associated with the printing device; a unit that acquires user authentication setting information on printer; a unit that selects one of multiple acquisition units for job information based on the acquired information on the printer queue, and the user authentication setting information on printer; and a unit that acquires a list of job information from a cloud using the selected acquisition unit for job information.

SUMMARY

However, with this technique, there has been a problem that it is not possible to separately handle private processing information that is information on private processing of a user, and public processing information that is information on public processing of the user.

Aspects of non-limiting embodiments of the present disclosure relate to an information processing apparatus, a non-transitory computer readable medium storing information processing program, and information processing method that, when using a virtual apparatus which is an apparatus as a virtual one, are capable of separately handling private processing information that is information on private processing of a user, and public processing information that is information on public processing of the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: perform, upon synchronization of information to be processed related to processing between the apparatus and a virtual apparatus which is an apparatus as a virtual one, when the information to be processed is private processing information that is information on private processing of a user, the synchronization on a private virtual apparatus which is a virtual apparatus corresponding to the private processing, and when the information to be processed is public processing information that is information on public processing, the synchronization on a public virtual apparatus which is a virtual apparatus corresponding to the public processing.

BRIEF DESCRIPTION OF THE DRAWINGS

Exemplary embodiment of the present disclosure will be described in detail based on the following figures, wherein:

FIG. 4 is a schematic table illustrating an example of a configuration of an access information database according to the exemplary embodiment of the present disclosure;

FIG. 9 is a schematic table illustrating an example of another configuration of an access information database according to the exemplary embodiment of the present disclosure.

DETAILED DESCRIPTION

Hereinafter, an exemplary embodiment of the present disclosure will be described in detail with reference to the drawings. Note that in the exemplary embodiment, a case will be described in which an information processing apparatus of the present disclosure is applied to each of multiple image forming apparatuses located in various places including a share office and an on-site. In the exemplary embodiment, a case will be described in which multiple image forming apparatuses are applied to an image forming system that utilizes a cloud server to provide a cloud print service which uses each image forming apparatus as a virtual printer which is a printer as a virtual one. Utilizing this service allows a user out of the house to perform printing by an image forming apparatus via a cloud even from a terminal apparatus which cannot be connected to a network in which the image forming apparatus is installed. However, the information processing apparatus of the present disclosure is not necessarily applied to an image forming apparatus, and the information processing apparatus of the present disclosure may be applied to various computers such as a personal computer and a server computer.

Figure 1:
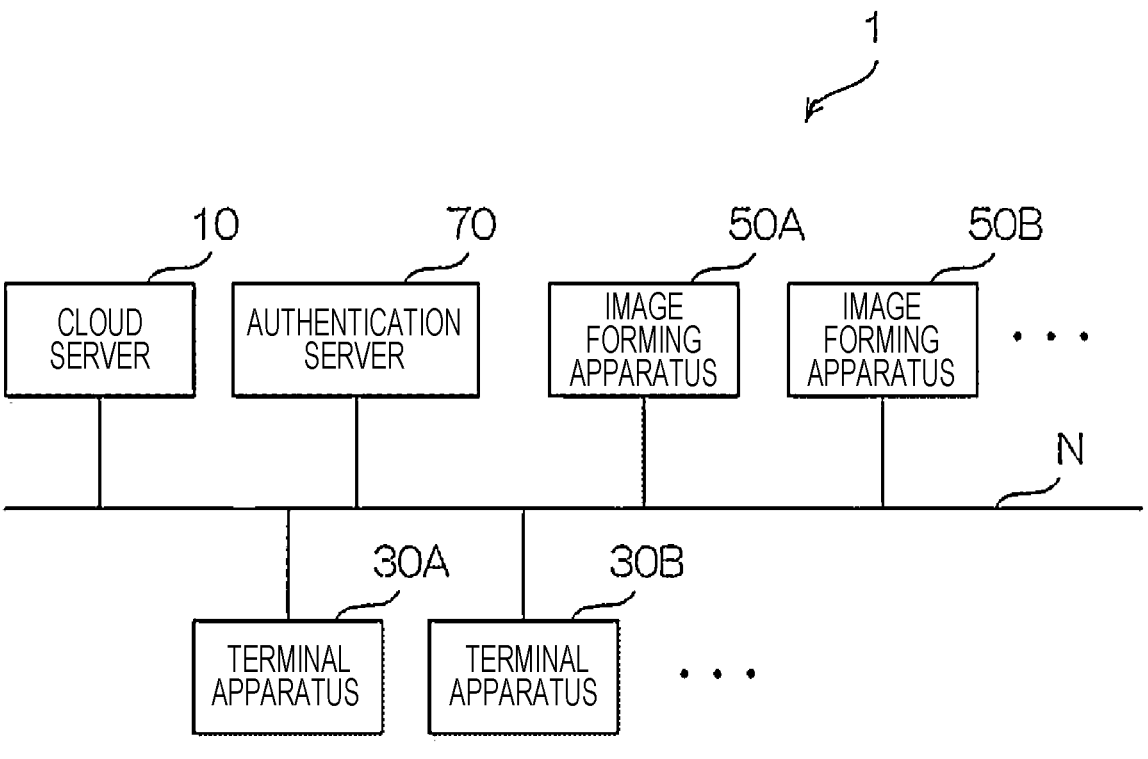
FIG. 1 is a block diagram illustrating an example of a configuration of an image forming system according to an exemplary embodiment of the present disclosure.

First, referring to FIG. 1, the configuration of an image forming system 1 according to the exemplary embodiment will be described. FIG. 1 is a block diagram illustrating an example of the configuration of the image forming system 1 according to the exemplary embodiment.

As illustrated in FIG. 1, the image forming system 1 according to the exemplary embodiment includes: a cloud server 10; multiple terminal apparatuses 30A, 30B, . . . ; multiple image forming apparatuses 50A, 50B, . . . ; and an authentication server 70. Note that hereinafter the terminal apparatuses 30A, 30B, . . . are collectively referred to as simply "terminal apparatus 30" without distinguishing them. Hereinafter the image forming apparatuses 50A, 50B, . . . are collectively referred to as simply "image forming apparatus 50" without distinguishing them.

Examples of the cloud server 10, the terminal apparatus 30, and the authentication server 70 include information processing devices such as a personal computer and a server computer. In the exemplary embodiment, as the image forming apparatus 50, a digital multifunction printer having an image forming function, an image reading function and an image transmission function is used. However, the present disclosure is not limited to the exemplary embodiment, and as the image forming apparatus 50, other image forming apparatuses may be used, such as an image forming apparatus having an image forming function only, or an image forming apparatus having an image forming function and an image reading function only.

Needless to say, the image forming apparatuses 50A, 50B, . . . do not necessarily have the same specifications, and may have different services which can be provided, different settable items of the services, and different optional devices equipped.

In contrast, the cloud server 10 is to provide the above-mentioned cloud print service, and the authentication server 70 is to authenticate a user when logging in an image forming apparatus 50 to be managed by the image forming system 1. In the exemplary embodiment, the authentication by the authentication server 70 is such that when logging in an image forming apparatus 50, a user is authenticated with a user name and a password input by the user. For this reason, although illustration is omitted, for each of the users managed by the image forming system 1, information indicating a predetermined password is pre-registered in the authentication server 70 in association with a corresponding user name.

The cloud server 10, the terminal apparatus 30, the image forming apparatus 50, and the authentication server 70 are connected via a network N, so that the cloud server 10, the terminal apparatus 30, the image forming apparatus 50, and the authentication server 70 can communicate with each other through the network N.

In the exemplary embodiment, the network N is a combination of the Internet, a public communication line such as a telephone network, and a communication line within a company such as a local area network (LAN), and a wide area network (WAN); however, the network N is not limited to this configuration. For example, only one of the above-mentioned public communication line and communication line within a company may be used as the network N. In the exemplary embodiment, wired and wireless communication lines are used as the network N, however, without being limited to this, only one of the wired communication line and the wireless communication line may be used as the network N.

Figure 2:
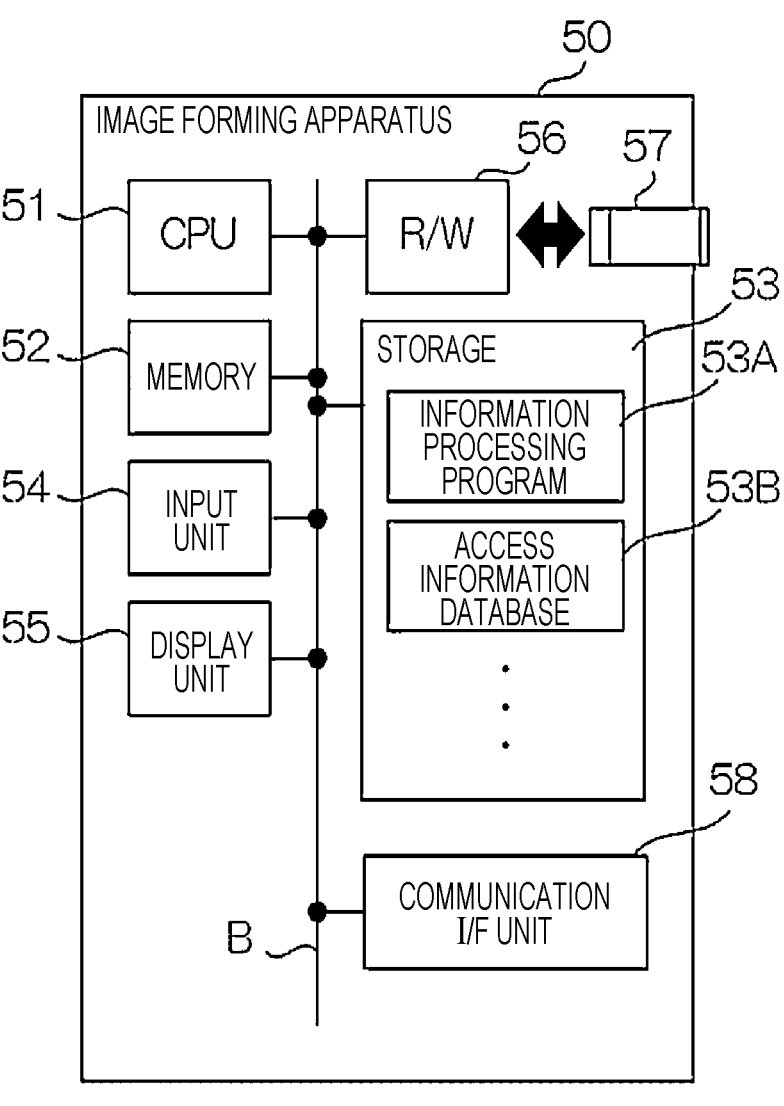
FIG. 2 is a block diagram illustrating an example of a hardware configuration of an electrical system of an image forming apparatus according to the exemplary embodiment of the present disclosure.

Next, referring to FIG. 2, the configuration of the image forming apparatus 50 according to the exemplary embodiment will be described. FIG. 2 is a block diagram illustrating an example of the hardware configuration of the electrical system of the image forming apparatus 50 according to the exemplary embodiment.

As illustrated in FIG. 2, the image forming apparatus 50 according to the exemplary embodiment includes a central processing unit (CPU) 51 as a processor, a memory 52 as a temporary memory area, a non-volatile storage 53, an input unit 54 provided with various switches, a display unit 55 such as a liquid crystal display, a medium reading and writing device (R/W) 56, and a communication interface (I/F) unit 58. The CPU 51, the memory 52, the storage 53, the input unit 54, the display unit 55, the medium reading and writing device 56, and the communication I/F unit 58 are connected to each other via a bus B. The medium reading and writing device 56 reads information written on a recording medium 57 and writes information to the recording medium 57.

The storage 53 according to the exemplary embodiment is implemented by a hard disk drive (HDD), a solid state drive (SSD), or a flash memory. In the storage 53 as a storage medium, an information processing program 53A is stored. The information processing program 53A is stored (installed) in the storage 53 as follows: the recording medium 57 on which the program is written is connected to the medium reading and writing device 56, and the medium reading and writing device 56 reads the program from the recording medium 57. The CPU 51 reads the information processing program 53A as needed from the storage 53 to expand it in the memory 52, and successively executes the processes of the information processing program 53A.

In addition, the storage 53 stores an access information database 53B. The details of the access information database 53B will be described below.

Although illustration is omitted, it is needless to say that the image forming apparatus 50 includes devices related to image processing, such as an image forming engine, and an image reading device.

Figure 3:
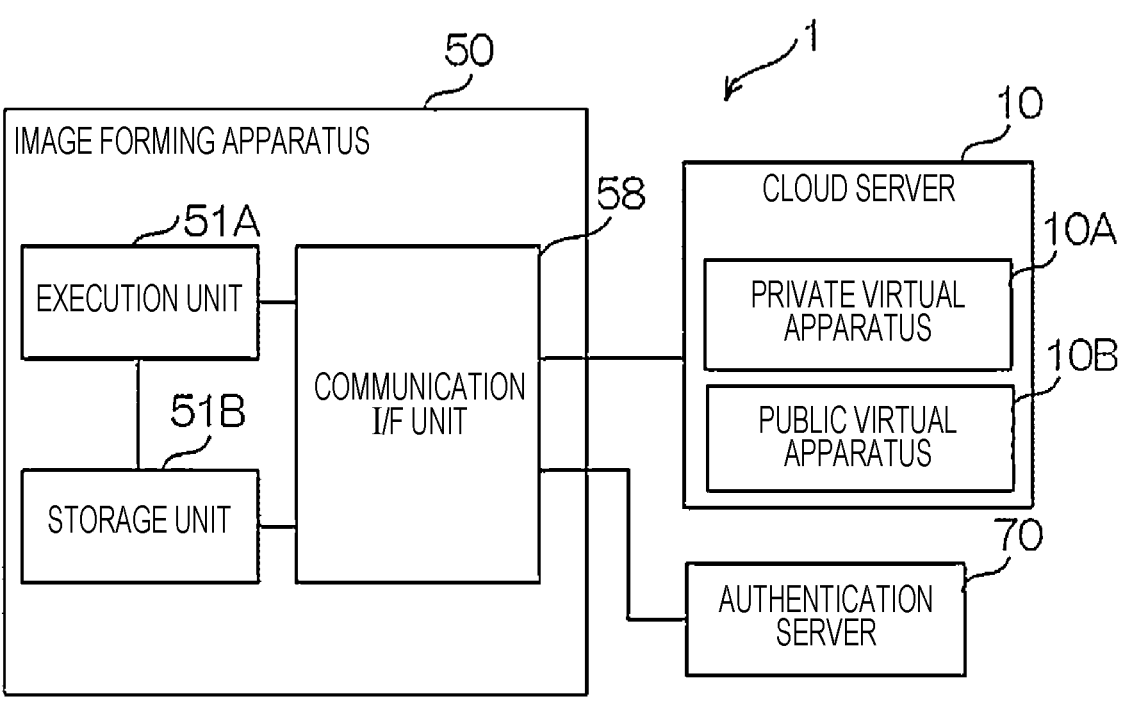
FIG. 3 is a block diagram illustrating an example of a functional configuration of the image forming apparatus according to the exemplary embodiment of the present disclosure.

Next, referring to FIG. 3, the functional configuration of the image forming apparatus 50 according to the exemplary embodiment will be described. FIG. 3 is a block diagram illustrating an example of the functional configuration of the image forming apparatus 50 according to the exemplary embodiment.

As illustrated in FIG. 3, the image forming apparatus 50 includes an execution unit 51A and a storage unit 51B. The CPU 51 of the image forming apparatus 50 executes the information processing program 53A, thereby functioning as the execution unit 51A and the storage unit 51B.

When information to be processed related to processing is synchronized between the apparatus and a virtual apparatus which is an apparatus as a virtual one and corresponds to the above-mentioned virtual printer, the execution unit 51A according to the exemplary embodiment performs the synchronization in the following manner. Specifically, when the information to be processed is private processing information that is information on private processing by a user, synchronization is performed on a private virtual apparatus 10A that is a virtual apparatus corresponding to the private processing. In contrast, when the information to be processed is public processing information that is information on public processing, synchronization is performed on a public virtual apparatus 10B that is a virtual apparatus corresponding to the public processing.

Note that "private processing" referred to herein means personal processing which includes, for example, processing related to a personal hobby, and processing related to a family. Also note that "public processing" referred to herein means public processing which includes, for example, processing performed as a task in a company, and processing related to administration.

In contrast, the storage unit 51B according to the exemplary embodiment stores public processing information in the public virtual apparatus 10B, and not in the apparatus. When history information related to the processing is included in at least one of the private processing information and the public processing information, the storage unit 51B according to the exemplary embodiment stores the history information in both the private virtual apparatus 10A and the public virtual apparatus 10B. When the history information includes private information of a user, the execution unit 51A according to the exemplary embodiment makes the private information non-referable.

In the exemplary embodiment, all of image reading processing, image forming processing and image transmission processing are applicable to the processing; however, the processing is not limited to these. For example, a combination of one type or two types of these processing may be applied to the processing.

Next, referring to FIG. 4, the access information database 53B according to the exemplary embodiment will be described. FIG. 4 is a schematic table illustrating an example of a configuration of the access information database 53B according to the exemplary embodiment.

The access information database 53B according to the exemplary embodiment is a database in which information is registered, the information being applied when the above-mentioned private virtual apparatus 10A and public virtual apparatus 10B are accessed, and synchronization is performed. As illustrated in FIG. 4 as an example, pieces of information on user name, type of data, and synchronization-destination address are stored in association with each other in the access information database 53B according to the exemplary embodiment.

In the image forming system 1 according to the exemplary embodiment, different user names are to be used in a case in which private processing is performed by a user using the image forming apparatus 50 and in a case in which public processing is performed by a user using the image forming apparatus 50.

The above-mentioned user names are information indicating a user name when private processing is performed by a user and a user name when public processing is performed, respectively. The example illustrated in FIG. 4 exemplifies a case in which "private1@freemail.com" is applied as the user name to be used when private processing is performed, and a case in which "employee1@abc-service.com" is applied as the user name to be used when public processing is performed.

The above-mentioned type of data is information indicating the type of data to be handled by the image forming system 1 according to the exemplary embodiment. As illustrated in FIG. 4, in the image forming system 1 according to the exemplary embodiment, as the above-mentioned type of data, three types of data are used: "document", "addressee data", and "job log".

The document is information indicating a contract document when the document is public, or information indicating a letter, a photo or the like when the document is private. The addressee data is information indicating the facsimile numbers and mail addresses of business contacts when the addressee data is public or information indicating the facsimile numbers and mail addresses of a family and friends when the addressee data is private. Furthermore, the job log is information on history of a job (processing), and mainly used by a company to utilize the activities of employees, and in principle, the job log does not include private information, but exceptionally may include private information in part.

In this manner, in the image forming system 1 according to the exemplary embodiment, as the type of data, the above-mentioned three types of information are used; however, the type of data is not limited to these. For example, other types of data, such as image log, audit log and, setting described below may be used as the type of data.

In contrast, the above-mentioned synchronization-destination address is information indicating the address of the virtual apparatus at a synchronization destination, corresponding to relevant user name and type of data. As illustrated in FIG. 4, in the exemplary embodiment, a uniform resource locator (URL) is used as the synchronization-destination address. As illustrated in FIG. 4, in the exemplary embodiment, "taro.shadow.com" is used as the synchronization-destination address corresponding to the private virtual apparatus 10A, and "abc-service.shadow.com" is used as the synchronization-destination address corresponding to the public virtual apparatus 10B.

For example, when the user name is "private1@freemail.com" for performing private processing, and the type of data is document, "taro.shadow.com" is used as the synchronization-destination address. In addition, when the user name is for performing private processing, and the type of data is job log, "abc-service.shadow.com" and "taro.shadow.com" are used as the synchronization-destination address.

In FIG. 4, a case is exemplified in which only one company is managed by the image forming system 1 to avoid a complicated situation; however, the present disclosure is not limited to this case. For example, multiple companies may be managed by the image forming system 1, and in this case, pieces of information as much as the number of companies are registered in the access information database 53B illustrated in FIG. 4.

Figure 5:
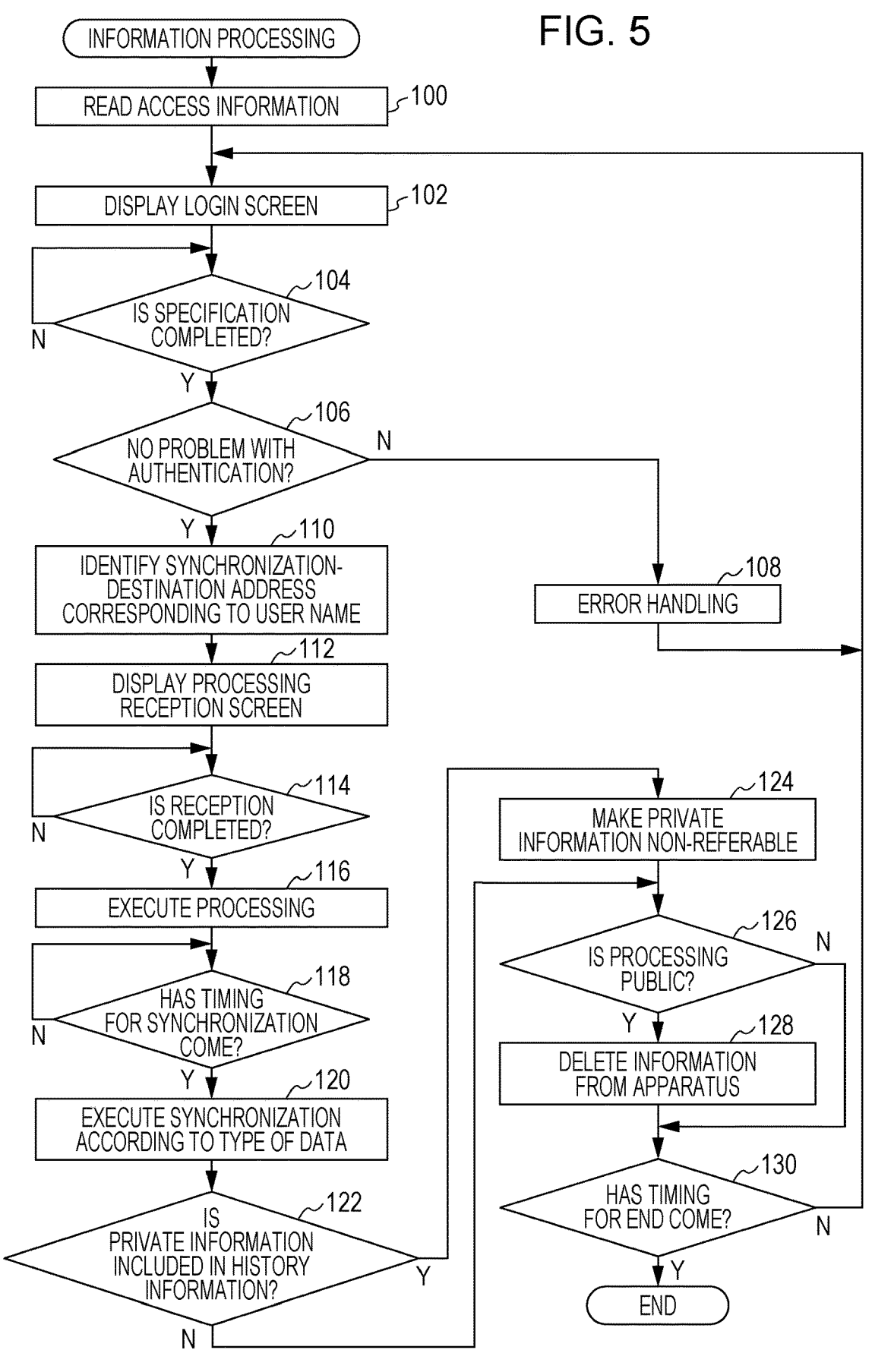
FIG. 5 is a flowchart illustrating an example of information processing according to the exemplary embodiment of the present disclosure.

Next, referring to FIG. 5 to FIG. 8, the operation of the image forming apparatus 50 according to the exemplary embodiment when performing information processing will be described. FIG. 5 is a flowchart illustrating an example of information processing according to the exemplary embodiment.

In the exemplary embodiment, when the power supply of the image forming apparatus 50 is turned on, the CPU 51 of the image forming apparatus 50 executes the information processing program 53A, thereby executing the information processing illustrated in FIG. 5. Here, to avoid a complicated situation, a case will be described in which the private virtual apparatus 10A for each user in each image forming apparatus 50, and the public virtual apparatus 10B for each image forming apparatus 50 have been already constructed in the cloud server 10. Also, to avoid a complicated situation, a case will be described in which the access information database 53B has been already constructed.

In step 100 of FIG. 5, the CPU 51 reads all the information (hereinafter referred to as the "access information") from the access information database 53B.

Figure 6:
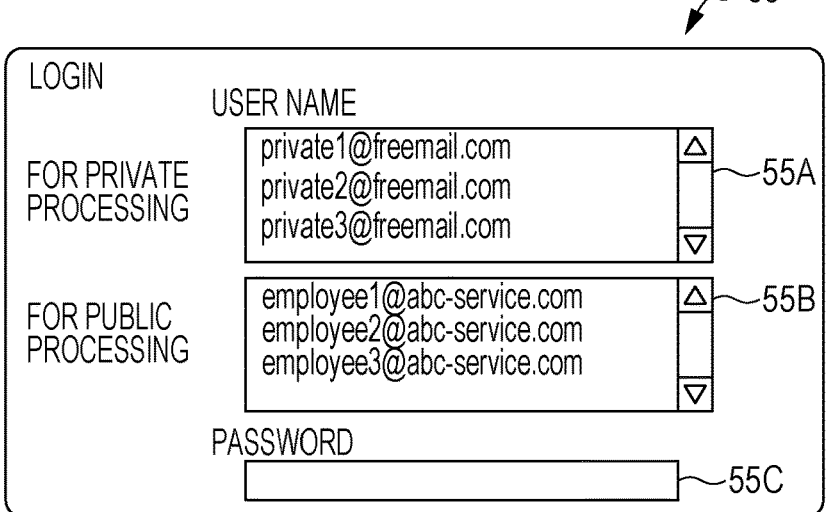
FIG. 6 is a front view illustrating an example of a login screen according to the exemplary embodiment of the present disclosure.

In step 102, the CPU 51 controls the display unit 55 so that a login screen having a predetermined configuration is displayed using information indicating user names in the read access information. In step 104, the CPU 51 is in standby until predetermined information is input. FIG. 6 illustrates an example of a login screen according to the exemplary embodiment.

As illustrated in FIG. 6, on the login screen according to the exemplary embodiment, a private use specification area 55A is displayed for selectively specifying the user name of a user when private processing is performed, and a public use specification area 55B is displayed for selectively specifying the user name of a user when public processing is performed.

When the login screen illustrated in FIG. 6 is displayed, a user uses the input unit 54 to specify his/her own user name displayed within the private use specification area 55A to perform private processing, or specify his/her own user name displayed within the public use specification area 55B to perform public processing. A user then inputs a password pre-assigned to the user to a password input area 55C. When a password is input by a user, affirmative determination is made in step 104, and the flow proceeds to step 106.

In step 106, the CPU 51 uses the user name specified by a user and the password input by the user to authenticate the user in the following manner.

Specifically, the CPU 51 transmits the user name and the password to the authentication server 70, and further transmits thereto, instruction information to instruct the authentication server 70 to authenticate the user. Upon receiving the instruction information, the authentication server 70 authenticates the user using the received user name and password, and transmits authentication result information to the image forming apparatus 50 as the instruction source, the authentication result information indicating whether the authentication is successful.

In step 106, the CPU 51 determines whether the received authentication result information indicates successful authentication, thereby determining whether there is no problem with the authentication, and when negative determination is made, the flow proceeds to step 108. In step 108, the CPU 51 performs predetermined error handling, and subsequently, the flow returns to step 102. In the exemplary embodiment, as the error handling, information indicating that authentication has failed is displayed on the display unit 55; however, needless to say, the error handling is not limited to this.

However, when affirmative determination is made in step 106, in other words, when there is no problem with authentication, the flow proceeds to step 110. In step 110, the CPU 51 identifies, from the read access information, the synchronization-destination address corresponding to the user name specified by a user.

Figure 7:
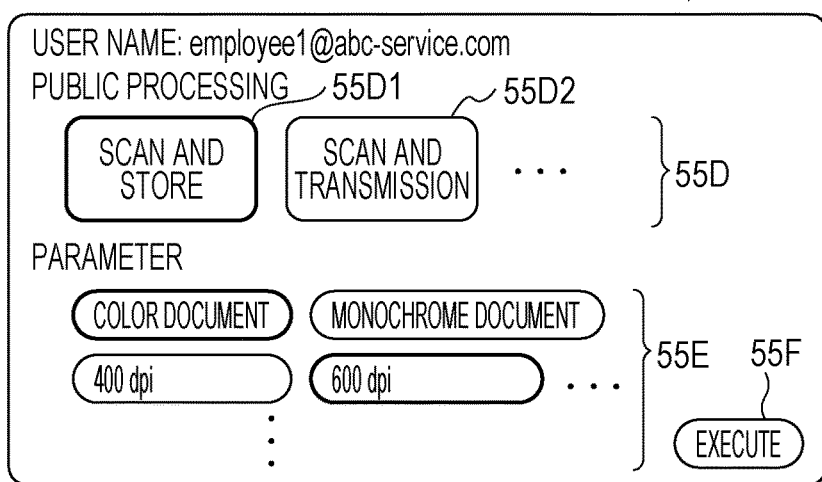
FIG. 7 is a front view illustrating an example of a processing reception screen (for public processing) according to the exemplary embodiment of the present disclosure.

In step 112, the CPU 51 controls the display unit 55 so that a processing reception screen having a predetermined configuration is displayed using the user name specified by a user. In step 114, the CPU 51 is in standby until predetermined information is input. FIG. 7 illustrates an example of a processing reception screen (public processing) according to the exemplary embodiment. In addition, FIG. 8 illustrates an example of a processing reception screen (private processing) according to the exemplary embodiment.

As illustrated in FIG. 7, when a user name for public processing is specified by a user, on the processing reception screen according to the exemplary embodiment, a user name corresponding to the public processing is displayed. In addition, on the processing reception screen according to the exemplary embodiment, multiple processing specification buttons 55D are displayed to show selectable types of processing, and specifying one of them by a user allows corresponding processing to be executed. Note that when a scan and store button 55D1 illustrated in FIG. 7 is specified, scan and store processing is executed, and when a scan and transmission button 55D2 is specified, scan and transmission processing is executed. Here, the scan and store processing is such processing that a document recorded on a recording medium such as paper is read and digitized as electronic data, and the document digitized as electronic data is stored in a corresponding virtual apparatus. In addition, the scan and transmission processing is such processing that a document recorded on the recording medium is read and digitized as electronic data, and the document digitized as electronic data is transmitted to a transmission destination specified by a user.

In addition, as illustrated in FIG. 7, on the processing reception screen according to the exemplary embodiment, a parameter specification button 55E is displayed to specify various parameters to be applied in the processing specified by a user. Note that FIG. 7 illustrates a state where "color document" and "600 dpi" are specified by a user.

Figure 8:
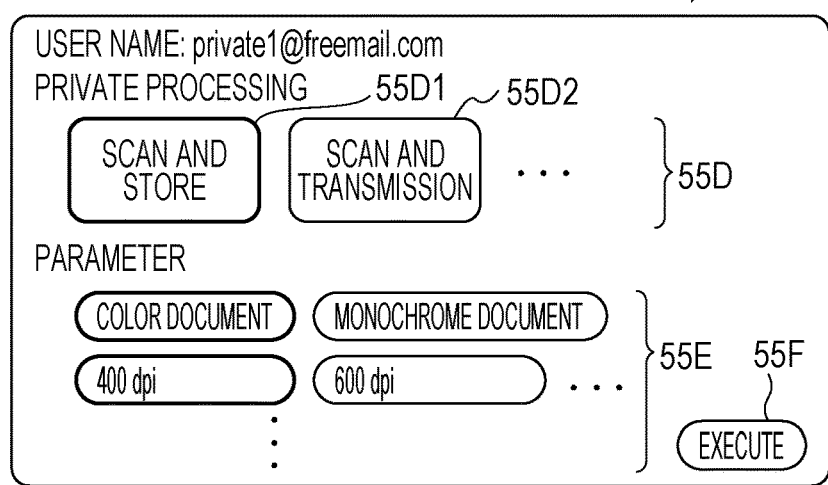
FIG. 8 is a front view illustrating an example of a processing reception screen (for private processing) according to the exemplary embodiment of the present disclosure.

As illustrated in FIG. 8, when a user name for private processing is specified by a user, the processing reception screen according to the exemplary embodiment is the same as the processing reception screen illustrated in FIG. 7 except that a user name corresponding to the private processing is displayed, thus a further description is omitted.

When the processing reception screen illustrated in FIG. 7 or FIG. 8 is displayed, a user uses the input unit 54 to specify a processing specification button 55D corresponding to desired processing. A user uses the parameter specification button 55E to specify one or more parameters to be applied when the processing is performed, and subsequently specifies an execution button 55F. When the execution button 55F is specified by a user, affirmative determination is made in step 114, and the flow proceeds to step 116.

In step 116, the CPU 51 executes the processing specified by a user using the one or more specified parameters. Execution of the processing causes the storage 53 of the apparatus to store a document and a job log generated with the processing, and the addressee data used by the processing.

In step 118, the CPU 51 is in standby until timing for performing predetermined synchronization between the apparatus and a corresponding virtual apparatus comes. In the exemplary embodiment, as the timing for performing predetermined synchronization, timing for each predetermined time period (30 seconds as an example) is applied; however, the timing is not limited to this. For example, a timing of updating the job log, and a timing when some sort of processing is performed may be applied to the timing for performing the synchronization.

In step 120, the CPU 51 executes synchronization to store (update) data such as a document and a job log in a corresponding virtual apparatus, the data being stored in the storage 53 by the processing in step 116. In this process, the CPU 51 executes synchronization by using a synchronization-destination address corresponding to each type of data to be synchronized. Therefore, for example, when private processing is executed, and the type of data to be synchronized is document, the synchronization destination is the private virtual apparatus 10A only. For example, when private processing is executed, and the type of data to be synchronized is job log, the synchronization destination is both the private virtual apparatus 10A and the public virtual apparatus 10B.

In step 122, the CPU 51 determines whether the job log (corresponding to the above-mentioned history information)

includes private information, and when negative determination is made, the flow proceeds to step 126, whereas when positive determination is made, the flow proceeds to step 124. As the private information included in the job log, an email address for personal use, and information (for example, an internet protocol (IP) address, and a media access control (MAC) address) which can identify the terminal apparatus 30 for personal use are exemplified.

In step 124, the CPU 51 executes processing to make private information non-referable, and subsequently, the flow proceeds to step 126, the private information being determined to be included in the job log stored in the public virtual apparatus 10B, by the processing in step 122. In the exemplary embodiment, as the processing to make the determined private information non-referable, processing to mask the information in the public virtual apparatus 10B is applied; however, the processing is not limited to this. For example, processing to delete the information in the public virtual apparatus 10B may be applied as the processing to make information non-referable.

In step 126, the CPU 51 determines whether the processing executed in step 116 is public processing, and when negative determination is made, the flow proceeds to step 130, whereas when positive determination is made, the flow proceeds to step 128.

In step 128, the CPU 51 deletes the information stored in the storage 53 of the apparatus by the processing in step 116, and subsequently, the flow proceeds to step 130.

In step 130, the CPU 51 determines whether a predetermined end timing has come as the timing to end the present information processing, and when negative determination is made, the flow proceeds to step 102, whereas when positive determination is made, the present information processing ends. In the exemplary embodiment, as the end timing, the timing when the power supply of the image forming apparatus 50 is turned off is applied; however, the end timing is not limited to this. For example, the end timing may be a timing when input is made via the input unit 54 by a user to instruct the apparatus to end the information processing.

In the exemplary embodiment, a case has been described in which the technique of the present disclosure is applied to a cloud print service; however, the present disclosure is not limited to this case. For example, the technique of the present disclosure may be applied to a print service, for example, using a network server in an organization without using a cloud server.

In the exemplary embodiment, a case has been described in which the access information database 53B is registered in the image forming apparatus 50; however, the present disclosure is not limited to this case. For example, the access information database 53B may be registered in the cloud server 10, or another apparatus accessible from the image forming apparatus 50.

In the exemplary embodiment, a case has been described in which as the access information database 53B, the one illustrated in FIG. 4 is applied; however, the present disclosure is not limited to this case. For example, as the access information database 53B, the one illustrated in FIG. 9 may be applied as an example.

In the access information database 53B illustrated in FIG. 9, image log, audit log and setting are added thereto in addition to the addressee data, the document and the job log illustrated in FIG. 4. The "explanation" illustrated in FIG. 9 is a description of corresponding information, and is included in the access information database 53B in FIG. 9 for the sake of convenience, however, is not necessarily registered in the access information database 53B.

Here, the above-mentioned image log is information indicating the thumbnail image of a document handled in the processing and having confidentiality equivalent to that of the document. The above-mentioned audit log is a record of events not to be processed, and is information such as login and change of setting. Furthermore, the above-mentioned setting is information indicating, for example, a time and default parameters applied at the time of execution of a copy function.

In the exemplary embodiment, a case has been described in which when the history information (job log) includes private information, the private information is made non-referable; however, the present disclosure is not limited to this case. For example, also in a case in which the history information includes highly confidential information, the highly confidential information may be made non-referable. Note that as the highly confidential information, the addresses of transmission destinations and the names of documents handled are exemplified.

In the exemplary embodiment, a case has been described in which processing to directly read an image is to be performed in the image forming apparatus 50; however, the present disclosure is not limited to this case. For example, print jobs corresponding to various types of processing are transmitted to a desired image forming apparatus 50 using either terminal apparatus 30, and processing according to the print jobs may be executed on the image forming apparatus 50. In this case, authentication of a user using the authentication server 70 may be performed by the terminal apparatus 30.

Although the exemplary embodiment has been described above, the technical scope of the present disclosure is not limited to the scope described in the exemplary embodiment. Various modifications or improvements can be made to the exemplary embodiment in a range not departing from the gist of the disclosure, and embodiments to which the modifications or improvements are made are also included in the technical scope of the present disclosure.

The exemplary embodiment is not intended to limit the disclosure according to the claims, and all the combinations of the features described in the exemplary embodiment are not necessarily essential to the solution of the disclosure. The exemplary embodiment described above includes the disclosure at various stages, and various aspects of the disclosure are provided by combining multiple claim components disclosed. As long as an effect is obtained even with some claim components removed from all claim components shown in the exemplary embodiment, the configuration with some claim components removed can be provided as the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, in the exemplary embodiment, a case has been described in which information processing is implemented by a software configuration utilizing a computer through execution of programs; however, the present disclosure is not limited to this case. For example, information processing may be implemented by a hardware configuration or a combination of a hardware configuration and a software configuration.

In addition, the configuration of the image forming apparatus 50 described in the exemplary embodiment is an example, and needless to say, unnecessary portions may be removed and/or new portions may be added within a scope not departing from the gist of the present disclosure.

In addition, the flow of information processing described in the exemplary embodiment is also an example, and needless to say, unnecessary steps may be omitted, new steps may be added, and/or the order of processing may be changed within a scope not departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:
a processor configured to:
perform, upon synchronization of information to be processed related to processing between the information processing apparatus and a virtual apparatus which is an apparatus as a virtual one, when the information to be processed is private processing information that is information on private processing of a user, the synchronization on a private virtual apparatus which is a virtual apparatus corresponding to the private processing, and when the information to be processed is public processing information that is information on public processing, the synchronization on a public virtual apparatus which is a virtual apparatus corresponding to the public processing.

(((2)))

The information processing apparatus according to (((1))),
wherein the processor is configured to
store the public processing information in the public virtual apparatus, and not in the information processing apparatus.

(((3)))

The information processing apparatus according to (((1))) or (((2))),
wherein the processor is configured to
when history information related to the processing is included in at least one of the private processing information and the public processing information, store the history information in both the private virtual apparatus and the public virtual apparatus.

(((4)))

The information processing apparatus according to (((3))),
wherein the processor is configured to
when the history information includes private information of the user, make the private information non-referable.

(((5)))

The information processing apparatus according to any one of (((1))) to (((4))),
wherein the information processing apparatus is an image processing apparatus, and the processing is related to image processing.

(((6)))

The information processing apparatus according to (((5))),
wherein the processing related to image processing is at least one of image reading processing, image forming processing, and image transmission processing.

What is claimed is:

1. An information processing apparatus comprising:
a scanner configured to read information written on a recording medium;
a display; and
a processor configured to:
display, on the display, a processing reception screen from which a user may select from at least one processing performable by the information processing apparatus; and
upon selection by the user of a scanning processing from the processing reception screen, cause the scanner to read the information written on the recording medium and perform synchronization of the read information between the information processing apparatus and a virtual apparatus, wherein:
when the read information is private processing information that is information on private processing of the user, the synchronization is performed on a private virtual apparatus which is a virtual apparatus corresponding to the private processing;
when the read information is public processing information that is information on public processing, the synchronization is performed on a public virtual apparatus which is a virtual apparatus corresponding to the public processing; and
when history information related to the scanning processing is included in at least one of the private processing information and the public processing information, the processor is further configured to store the history information in both the private virtual apparatus and the public virtual apparatus.

2. The information processing apparatus according to claim 1,
wherein the processor is configured to:
store the public processing information in the public virtual apparatus, and not in the information processing apparatus.

3. The information processing apparatus according to claim 1,
wherein the processor is configured to:
when the history information includes private information of the user, make the private information non-referable.

4. The information processing apparatus according to claim 1, wherein the information processing apparatus is an image processing apparatus.

5. A non-transitory computer readable medium storing an information processing program causing a processor of an information processing apparatus to execute a process comprising:
displaying, on a display of the information processing apparatus, a processing reception screen from which a user may select from at least one processing performable by the information processing apparatus; and
upon selection by the user of a scanning processing from the processing reception screen, causing a scanner of the information processing apparatus to read information written on a recording medium and performing synchronization of the read information between the information processing apparatus and a virtual apparatus, wherein:

when the read information is private processing information that is information on private processing of the user, the synchronization is performed on a private virtual apparatus which is a virtual apparatus corresponding to the private processing, and when the read information is public processing information that is information on public processing, the synchronization is performed on a public virtual apparatus which is a virtual apparatus corresponding to the public processing; and when history information related to the scanning processing is included in at least one of the private processing information and the public processing information, the executed process further comprises causing the history information to be stored in both the private virtual apparatus and the public virtual apparatus.

6. An information processing method comprising:

displaying, on a display of an information processing apparatus, a processing reception screen from which a user may select from at least one processing performable by the information processing apparatus; and

upon selection by the user of a scanning processing from the processing reception screen, reading information written on a recording medium with a scanner of the information processing apparatus and performing synchronization of the read information between the information processing apparatus and a virtual apparatus, wherein:

when the read information is private processing information that is information on private processing of the user, the synchronization is performed on a private virtual apparatus which is a virtual apparatus corresponding to the private processing;

when the read information is public processing information that is information on public processing, the synchronization is performed on a public virtual apparatus which is a virtual apparatus corresponding to the public processing; and when history information related to the scanning processing is included in at least one of the private processing information and the public processing information, the method further comprises storing the history information in both the private virtual apparatus and the public virtual apparatus.

* * * * *